Feb. 13, 1923.

A. O. MURDOCK

RESERVE OIL TANK FOR AUTOMOBILES

Filed May 5, 1921

1,445,541

Inventor
ALBERT O. MURDOCK
By Howard R. Eccleston

Attorney

Patented Feb. 13, 1923.

1,445,541

UNITED STATES PATENT OFFICE.

ALBERT O. MURDOCK, OF FORT PAYNE, ALABAMA.

RESERVE OIL TANK FOR AUTOMOBILES.

Application filed May 5, 1921. Serial No. 466,928.

*To all whom it may concern:*

Be it known that I, ALBERT O. MURDOCK, a citizen of the United States, residing at Fort Payne, in the county of Dekalb and State of Alabama, have invented certain new and useful Improvements in Reserve Oil Tanks for Automobiles, of which the following is a specification.

My invention relates to an oil tank for automobiles and more particularly for Ford cars, and has for its object to provide such a tank which can be conveniently placed under the engine hood and be connected up with the bottom oil gage aperture common to Ford cars.

Another object of the invention is to provide such a device with a valve and means for operating the same, the latter being located at or near the dash-board for convenient manipulation.

Another object of the invention is to provide such a device with means whereby it may be attached to the Ford car without in any way altering the structure thereof.

Other objects and advantages of the device will appear from the following description when taken in connection with the accompanying drawings, in which.

Figure 1:
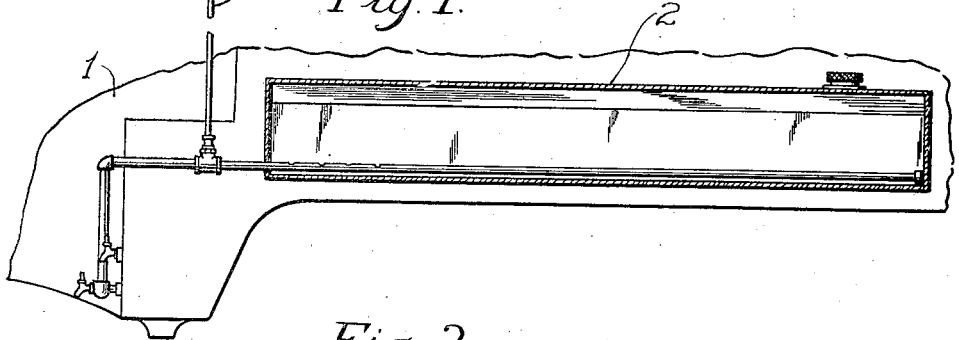
Fig. 1 is a fragmentary view of the engine with the tank in longitudinal section; taken on line 1—1 Fig. 3.
Figure 2:
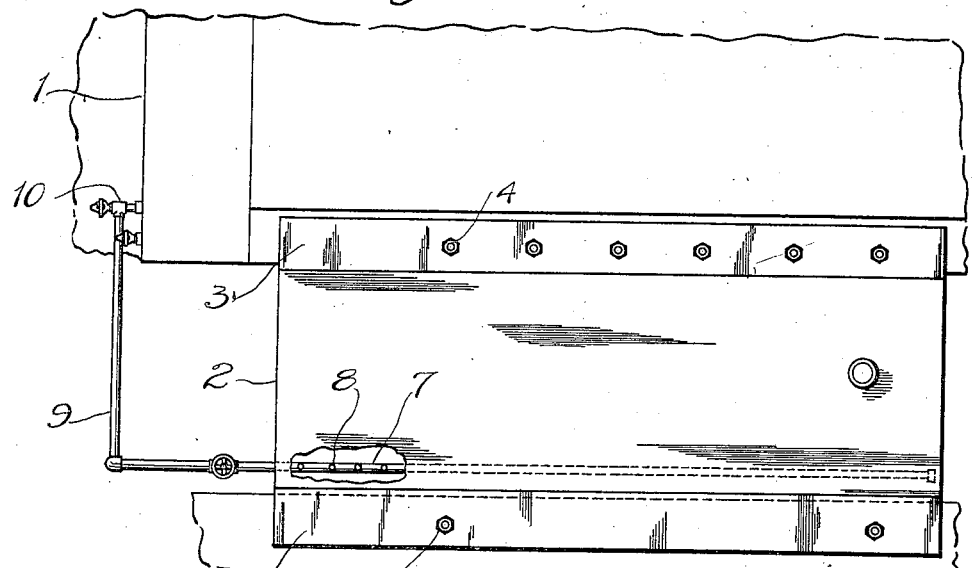
Fig. 2 is a plan view of the device.
Figure 3:
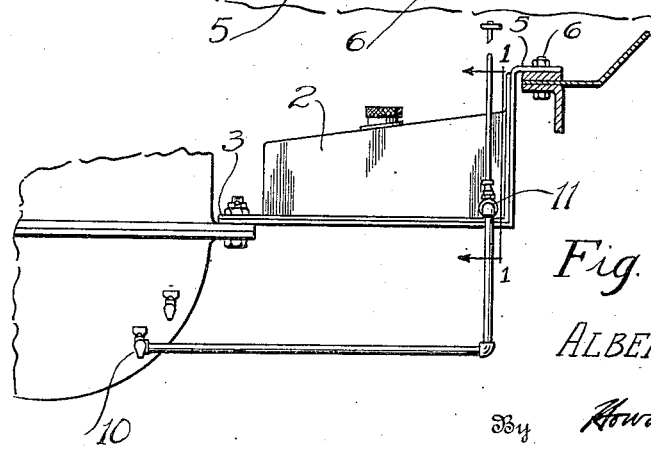
Fig. 3 is an end view thereof, portions of the automobile being shown in section.

Referring to the drawings more in detail, the numeral 1 designates generally the Ford or other automobile to which my invention is attached. The tank is indicated by the numeral 2 and is provided at its bottom edge with a laterally extending flange 3, the latter being provided with six bolt holes to receive the bolts 4, which secure the crank case to the engine.

At the opposite side of the tank and at its upper edge is provided another laterally extending flange 5. This flange is provided with two bolt holes to receive the bolts 6 which secure the rail to the frame of the automobile. These bolts referred to are all standard to Ford cars.

Extending longitudinally of the bottom of the tank is a pipe 7, having perforations 8, for conducting the oil from the tank to the engine when required. This pipe is provided with a downwardly extending portion 9 which is connected with the bottom oil hole 10 of the automobile.

Suitably located in the pipe 7, on the outside of the tank is a valve 11, which is operated by means of the shaft 12, or other convenient means. The valve operating means, in whatever form used, is located at a position accessible from the driver's seat.

It will be seen from the above that I have provided means whereby, at any time, additional oil may be supplied to the crank case by merely operating the valve 11 and without the necessity of leaving the seat.

Having fully described my invention, what I claim as new and desire to secure by Letters Patent is:

1. The combination with an automobile, of a substantially flat oil tank, laterally extending flanges on diagonal edges of the tank, one of said flanges being secured to the engine body and the other flange being secured to the ledge of the car body at the point at which the fender is secured.

2. The combination with an automobile, of an elongated, substantially flat oil tank, laterally extending flanges on said tank for securing the same to the engine ledge and the ledge of the car body at the point where the fender is secured, a pipe leading from said tank to an oil level testing cock in the engine crank case, and means for regulating the flow of oil through said pipe.

ALBERT O. MURDOCK.